Feb. 10, 1942.　　W. N. CHITTENDEN　　2,272,185
COLLET CHUCK
Filed Oct. 30, 1939
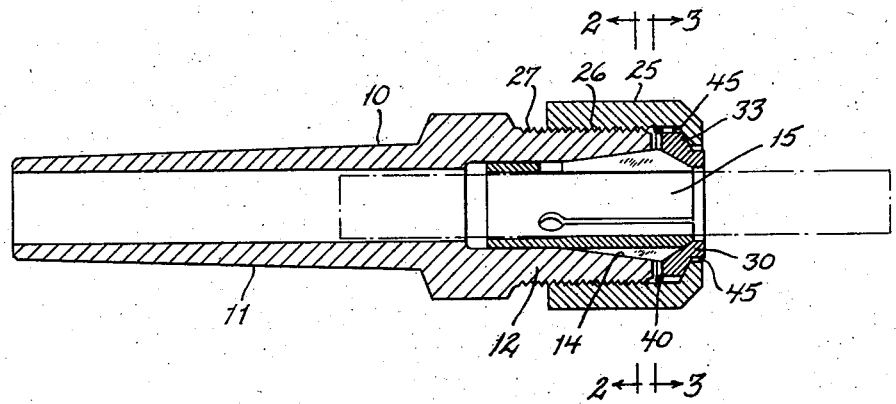
Fig. 1
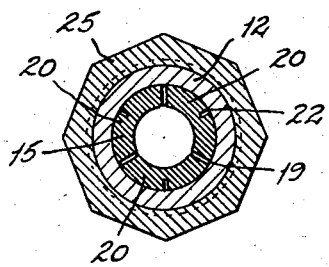
Fig. 2
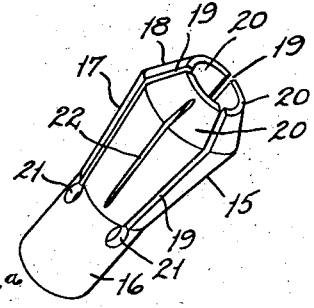
Fig. 4
Fig. 6.
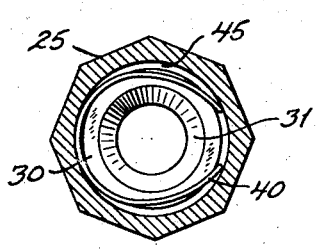
Fig. 3
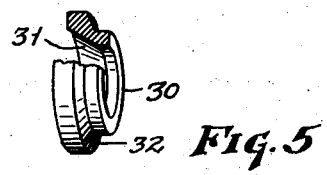
Fig. 5
INVENTOR.
WINDSOR N. CHITTENDEN
BY Bates, Teare, & McBean
ATTORNEYS Patented Feb. 10, 1942

2,272,185

UNITED STATES PATENT OFFICE 2,272,185

COLLET CHUCK

Windsor N. Chittenden, Cincinnati, Ohio, assignor to Chittenden Corporation, Cleveland, Ohio, a corporation of Ohio Application October 30, 1939, Serial No. 301,924

3 Claims. (Cl. 279—49)

This invention relates to improvements in collet chucks such as are employed in machine tools to hold work pieces, such as drill stocks and needle bars or in some instances to hold tools. The present invention is especially concerned with an improved collet chuck of the nose collapsing type, adapted to grip objects such as needle bars and other stock, while positioning such objects for rotation with the utmost degree of axial precision. These therefore are the general objects of the present invention.

Collet chucks of the nose collapsing type offer many advantages over other types of collets, as for instance, the draw-in type collets. This is due to the fact that the nose collapsing type of collet provides for greater stock areas, that is, stock of a larger diameter, than other types of collets, for given spindle diameters. This likewise permits the collet to be constructed in a stronger manner than other types of collets without decreasing the capacity for a given spindle size.

In spite of the inherent advantages of the nose collapsing type of collet, some of which have been mentioned above, this type of collet is not generally popular because it has been found extremely difficult to attain the high degree of accuracy with such a collet as is required in present day manufacturing methods.

One of the objects of the present invention is to provide a collet of the nose collapsing type which will have a high degree of accuracy, great strength and which will position objects for rotation with the utmost degree of axial precision and yet retain the inherent advantages of the nose collapsing type of collet.

I have found that many of the inaccuracies, in centering objects by a nose collapsing type of collet have been brought about by binding action in the collet chuck which is transmitted to the collet. Some of the binding action is due to a camming action between the threads used for tightening the collet in the chuck, as well as to the manner in which the collet is tightened by the workman. The degree of these inaccuracies has varied in proportion to the pressure applied to tighten the collet. Such errors also increase both in number and magnitude with the life of the collet. A more specific object of the present invention is to provide a collet of the type mentioned. which will overcome the disadvantages set forth.

A further object of the present invention is to provide a collet of the nose collapsing type in which comparatively small inaccuracies due to inherent characteristics of the metal and the equipment used in the manufacture of the collet will not be increased in magnitude to such extent as to render the collet unfit for use in instances where precise axial alignment is required.

A further object of the present invention is to provide a collet chuck of the nose collapsing type which will not require special attention of the workman when slightly under or over sized objects are positioned therein, and which will despite the discrepancy in size, grip such work pieces with a high degree of axial precision.

Other objects of the present invention will become more apparent with the following description, reference being had to the accompanying drawing in which there is illustrated a preferred embodiment of the invention. The essential characteristics of the invention will be summarized in the claims.

Referring now to the drawing, Fig. 1 is a centrally located axial section through a collet chuck embodying my invention; Figs. 2 and 3 are radial sections through the collet, the plane of the sections being indicated by the correspondingly numbered lines on Fig. 1; Fig. 4 is a perspective view of the collet itself; Fig. 5 is a perspective view, partially in section, of a compensating member of the collet chuck, and Fig. 6 is a sectional detail of a modified form of compensating member.

In the drawing I have illustrated my improved collet chuck as having a hollow body 10, provided with a hollow tapered shank 11 adapted to fit within the head stock of a lathe or machine tool, in intimate driving relationship therewith, in the usual manner. The body is provided with a hollow head portion 12 which receives the collet and collet clamping mechanism. The walls of the shank 11, may be made comparatively thin and constitute the only restriction within the spindle of the machine tool, thus, objects such as bar stock of a comparatively large diameter may be extended through the shank and spindle of the machine tool.

The head 12 of the chuck body has an enlarged base within which the collet 15 is mounted. The collet 15 is best illustrated in Fig. 4, and follows the more or less conventional design. As shown, the collet has an annular shank or backing portion 16 which extends into the chuck body. This shank is made somewhat heavier and shorter than has been the general custom in the past, to prevent collapsing of that end of the collet when an object is gripped only at the extreme nose end of the collet. The body of the collet is tapered outwardly from the shank 16 at an angle which is acute to its axis, as indicated at 17. This tapered portion 17 coacts with a correspondingly tapered seat 14 formed in the head of the chuck. The relative length of the seat 18 and tapered portion 17 of the collet is such that the collet at all times will extend outwardly beyond the end of the body portion of the chuck. The nose of the collet is also tapered as at 18, at an acute angle to the axis of the collet but at a somewhat greater angle than the angle of the tapered portion 17 and in a reverse direction. Suitable slots 19 extend inwardly from the nose of the collet to the shank thereof forming a plurality of jaws 20. To facilitate bodily movement of these jaws, the slots 19 terminate in enlarged openings 21, and intermediate slots 22 are provided as shown in Fig. 4.

The object to be gripped, indicated at "W" in the drawing is inserted in the collet and the jaws 20 are forced into engagement therewith by a hollow clamping nut 25. This nut, shown in Figs. 1 and 2, is provided with internal threads 26 which are arranged to coact with external threads 27 of the head 12 of the collet chuck body. Due to an error compensating member an extreme degree of accuracy in these threads is not essential to the accuracy of the collet. The outer surface of this nut may be hexagonal, or provided with spanner wrench openings to permit it to be tightened by a wrench, or it may be provided with a hand wheel (not illustrated) but which may be formed integral with the nut in the usual manner.

The clamping pressure, resulting from the drawing of the nut onto the chuck body, as heretofore mentioned, is transmitted to the collet 15 through the medium of a compensating member or ring 30. This ring is smaller in diameter than the internal diameter of the nut 25 providing radial clearance as indicated at 45 in Fig. 1. The ring 30 is provided with an inner conical or tapared surface 31 which is complementary to the tapered surface 18 of the nose of the collet when the latter is in its normal contracted condition. The outer surface of this ring is tapered as at 32 at an obtuse angle to the axis of the chuck and is arranged to engage a correspondingly tapered surface 33 formed on the interior of the nut 25.

The ring 30 is thus free to float relative to the nut, the chuck body and the collet. Hence, any binding action resulting from an eccentric movement of the nut relative to the body will not be transmitted to the collet. Likewise, the camming action between the threads, due to the climbing of the nut along the thread angle, which action increases in magnitude as the tightening pressure is applied to the nut, will not be transmitted to the collet. Such camming actions are sometimes caused by the unequal application of the tightening pressure to the nut 25. This unequal pressure sometimes causes the nut to climb on the threads at one point of the chuck body to a greater extent than at other points, thus imparting a skewing action to the nut. In my improved collet chuck such skewing action of the nut will be compensated for by movement between the nut and the compensating ring. The surfaces 33 of the nut and 32 of the ring permit the nut to move relative to the ring and at an angle which is substantially the same as the thread angle.

While I have illustrated the surfaces 33 and 32 in Figs. 1 and 5 as conical, they may be made spherical as indicated at 32a in Fig. 6. However, I have found that because of the short length of such surfaces, a flat surface so closely approximates a spherical surface as to be equally as efficient.

As heretofore mentioned, the compensating ring 30 is free to move relative to the chuck body as well as relative to the nut. This feature of my invention is important for precise axial alignment. When a collet and workpiece are inserted in the chuck, with the axis of the chuck horizontal, as when the chuck is mounted in a lathe, the weight of the parts and the taper of the coacting surfaces between the collet and the chuck bring the collet axis below the chuck axis. Now as tightening of the collet takes place, due to the drawing up of the clamping nut, the compensating ring which is being forced against the collet, being movable relative to both the nut and the chuck body is free to follow the collet, thus insuring precise axial centering of the collet. Further, discrepancies in the temper and springiness of the collet jaws one relative to another have been found to exist. Indeed, a collet may be made as precise as present day instruments will detect, and placed in use, or even set on a shelf for several days, then re-examined and found to be out of true. In my improved collet chuck the compensating ring 30 will move to compensate for such inaccuracies in the collet and a true centering of the work will take place.

To facilitate the use of my improved collet chuck I position the compensating ring in the nut by a resilient wire ring 40 which seats in an internal groove in the nut and loosely engages the ring 30 as shown in Figs. 1 and 3.

From the foregoing description it will be seen that I have provided a nose collapsing collet chuck which may be economically constructed and which may be used equally as well by skilled and unskilled workmen, and yet which will center an object for rotation with an extremely high degree of precision regardless of the clamping pressures applied to the clamping member of the chuck and in which minor inaccuracies of the component parts, which inaccuracies in and of themselves do not materially offset the precision of the chuck, are not multiplied when the chuck is placed in use as has been the case with collet chucks of this type used in the past.

I claim:

1. In a collet chuck comprising a body formed to cooperate with a machine tool and having a tapered socket in one end thereof, a collet insertable in said socket and formed with a plurality of gripping jaws adapted and arranged to flex inwardly as the collet is pressed into said socket, a compression member having a bore for the passage of the tool carried by said body and movable toward the collet to press the same into the socket, means comprising a ring freely floating in said bore interposed between said member and said collet to transmit the pressure from said member to said collet, said ring having a tapered shoulder engaging a tapered flange on the compression member with substantially a line contact to provide for limited radial movement of the ring to compensate for distortion and stress induced by tightening of the compression member.

2. In a collet chuck comprising a body formed to cooperate with a machine tool and having a tapered socket in one end thereof, a collet insertable in said socket and formed with a plurality of gripping jaws adapted and arranged to flex inwardly as the collet is pressed into said socket, a compression member having a bore for the passage of the tool carried by said body and movable toward the collet to press the same into the socket, means comprising a ring freely floating in said bore interposed between said member and said collet to transmit the pressure from said member to said collet, said ring having a spherical surface engaging a tapered flange on the compression member with substantially a line contact to provide for limited radial movement of the ring to compensate for distortion and stress induced by tightening of the compression member.

3. In a collet chuck comprising a body formed to cooperate with a machine tool and having a tapered socket in one end thereof, a collet insertable in said socket and formed with a plurality of gripping jaws adapted and arranged to flex inwardly as the collet is pressed into said socket, a compression member having a bore for the passage of the tool carried by said body and movable toward the collet to press the same into the socket, means comprising a ring freely floating in said bore interposed between said member and said collet to transmit the pressure from said member to said collet, said ring having a conical shoulder engaging a conical flange on the compression member with substantially a line contact, said conical flange and conical shoulder being of different angularity to provide for limited radial movement of the ring to compensate for distortion and stress induced by tightening of the compression member.

WINDSOR N. CHITTENDEN.